United States Patent
Liu et al.

(10) Patent No.: US 11,132,113 B1
(45) Date of Patent: Sep. 28, 2021

(54) INTERACTION SIGNAL PROCESSING IN DISTRIBUTED COMPUTING SYSTEMS

(71) Applicant: Microsoft Technology Licensing, LLC, Redmond, WA (US)

(72) Inventors: Bo Liu, Sammamish, WA (US); Ke Wang, Redmond, WA (US); Ahmed Hassan Mohamed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/937,194

(22) Filed: Jul. 23, 2020

(51) Int. Cl.
| H04L 12/00 | (2006.01) |
| G06F 3/0484 | (2013.01) |
| H04L 29/08 | (2006.01) |
| G06F 9/451 | (2018.01) |
| H04L 29/06 | (2006.01) |
| G06F 9/455 | (2018.01) |

(52) U.S. Cl.
CPC ...... *G06F 3/04842* (2013.01); *G06F 3/04847* (2013.01); *G06F 9/451* (2018.02); *G06F 9/45529* (2013.01); *H04L 67/02* (2013.01); *H04L 67/42* (2013.01)

(58) Field of Classification Search
CPC ............ G06F 3/01842; G06F 3/04847; G06F 9/45529; G06F 9/451; H04L 67/02; H04L 67/42
USPC ................................................. 709/203, 204
See application file for complete search history.

(56) References Cited

U.S. PATENT DOCUMENTS

| 9,037,913 | B2 | 5/2015 | Dixit et al. |
| 9,836,193 | B2 | 12/2017 | Ligman et al. |
| 9,961,127 | B2 | 5/2018 | White et al. |
| 10,552,290 | B2 | 2/2020 | Amichai et al. |
| 10,635,276 | B2 | 4/2020 | Sun et al. |
| 10,817,145 | B1 * | 10/2020 | Bourgeois ........... G06F 3/04842 |
| 2005/0171976 | A1 * | 8/2005 | West ................... G06F 16/2423 |
| 2006/0285656 | A1 * | 12/2006 | Saborowski .............. G06F 8/61 379/67.1 |
| 2007/0300166 | A1 * | 12/2007 | Ehret .................. G06F 9/45512 715/760 |
| 2011/0251891 | A1 * | 10/2011 | Satyavolu ............. H04M 15/84 705/14.49 |

(Continued)

OTHER PUBLICATIONS

Understanding User Behavior with Google Analytics, Retrieved from: https://web.archive.org/web/20190417094257/https:/support.google.com/analytics/answer/7126596?hl=en, Apr. 17, 2019, 7 Pages.

*Primary Examiner* — Frantz Coby
(74) *Attorney, Agent, or Firm* — Liang IP, PLLC

(57) ABSTRACT

Techniques of interaction data processing in a distributed computing system are disclosed herein. One example technique includes upon receiving a user interface output having a content item to be surfaced on a client device and a script configured to detect an interaction with the content item at the client device, surfacing the user interface output having the content item on a display of the client device and automatically executing the script embedded in the user interface output to detect an interaction with the surfaced content item at the client device. Upon detecting an interaction with the content item on the surfaced user interface output, the example technique also includes generating and transmitting interaction data representing the detected interaction to a remote server.

20 Claims, 7 Drawing Sheets

(56) References Cited

U.S. PATENT DOCUMENTS

| | | |
|---|---|---|
| 2013/0104041 A1 | 4/2013 | Seshagiri et al. |
| 2014/0095931 A1* | 4/2014 | Sadasivam .......... G06F 11/3688 714/28 |
| 2014/0344455 A1 | 11/2014 | Cheng et al. |
| 2015/0007129 A1* | 1/2015 | William .................... G06F 8/36 717/106 |
| 2016/0285841 A1* | 9/2016 | Marcy ................. H04W 12/068 |
| 2017/0132024 A1 | 5/2017 | Desineni et al. |
| 2019/0146616 A1 | 5/2019 | White et al. |
| 2019/0303178 A1 | 10/2019 | Mastracci |

* cited by examiner

INTERACTION SIGNAL PROCESSING IN DISTRIBUTED COMPUTING SYSTEMS

BACKGROUND

Remote or cloud computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines (VMs), containers, virtual switches, load balancers, and other types of virtualized components for resource sharing. During operation, the virtual machines or containers can facilitate execution of user applications to provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Typically, users can access various computing services or content provided by remote servers using client applications executed locally on client devices. For instance, a user can use an email client on a desktop or laptop computer to access emails received at a remote email server. In another example, a user can also use a messaging application on a smartphone to send and receive instant messages. In a further example, a user can use a conferencing application on a tablet to interact with other users facilitated by intermediate communications servers.

One drawback of using different client applications to access content provided by remote servers is that an author of the content may need to develop different versions each suitable for a unique user interface (UI) experience of a corresponding application. For instance, a content item formatted as an email may need to be reformatted as an instant message. To address such a drawback, application-agnostic UI platforms have been developed to provide UI services that facilitate ready exchange of content. Such platforms allow an author to create content in a first format, such as JavaScript Object Notation ("JSON"). When delivered to a particular client application, a UI service can transform the JSON object into one or more native UI components, such as Hypertext Markup Language ("HTML") components adapted to surroundings of the client application. As such, the author of the content can create a single JSON object for distributing the same content item to multiple client applications with corresponding UI experiences. One example of such an application-agnostic UI platform is the Adaptive Card® provided by Microsoft Corporation of Redmond, Wash.

When developing a client application for accessing remote computing services or content, data representing events of user interactions with features of the client application and/or surfaced content items can be useful in determining functionality, usability, or other types of characteristic of the client application. Typically, data of user interactions are captured at a remote server that receives a function call from the client application executed at a client device. However, such server-side monitoring can have certain shortcomings. First, certain user interactions may not involve any function calls to the remote server, and thus may not be monitored at the remote server. For example, user interactions such as dwell time on a feature, link clicked, attachment opened, notes added, etc., may not involve any calls to a remote server. Secondly, the remote server may be managed by a third party. As such, even when user interactions involve function calls to the remote server, the provider of the remote server may not be allowed to and/or willing to share such information.

Several embodiments of the disclosed technology are directed to techniques of client-side interaction data capturing. According to certain aspects of the disclosed technology, an author of content can declaratively define data of user interactions to be captured at a client device instead of at a remote server. In certain implementations, a computing facility can execute a UI application to provide a monitoring service. The monitoring service can be configured to receive a definition file of content from an author. The definition file can include data that define one or more content items to be rendered and surfaced on a client device as well as one or more interaction data to be captured at the client device. Upon receiving a request for the content from a user, the monitoring service can be configured to render the one or more content items into a UI output with a format corresponding to or suitable for a client application used at the client device to surface the content. In one example, the monitoring service can be configured to convert the one or more content items into a HTML page having the one or more content items as HTML objects. In other examples, the monitoring service can render the one or more content items in other suitable formats or in other suitable manners.

The monitoring service can also be configured to embed one or more scripts corresponding to the one or more interaction data to be captured in the UI output, for example, as one or more script objects in the HTML page. In certain implementations, the UI output can also include a notification indicating to the user the interaction data to be collected. The UI output can also include a UI element that is configured to receive user consent or refusal for collection of such interaction data. Upon receiving a user refusal for collection of such interaction data, the one or more embedded scripts can be deactivated, for instance, by not automatically executing the one or more scripts upon surfacing the UI output on the client device.

The monitoring service can then be configured to provide the rendered UI output to a client device of the user. Upon receiving the UI output, the client device can be configured to surface the UI output in a client application (e.g., an email client) on the client device. The embedded one or more scripts can then be configured to detect one or more user actions or interactions with the one or more content items. In one example, one of the scripts can be configured to detect a user actuation of a button (e.g., labeled "More Info") on the UI output. In another example, one of the scripts can be configured to detect a click on a link shown in the UI output, an insertion of a comment by the user, or other suitable actions or interactions with content items on the UI output.

Upon detecting such actions or interactions, the embedded scripts can be configured to transmit certain the interaction data representing the detected actions or interactions to the monitoring service. The interaction data can be anonymized or otherwise obfuscated. For example, all personal identification information, such as name, identification number, IP address, etc. can be omitted in the interaction data. In other examples, multiple interaction data can be combined to generate a single set of interaction data. For instance, first interaction data representing surfacing the UI output can be combined with second interaction data representing closing the UI output to generate interaction data representing a dwell time of the user on the UI output.

Upon receiving the interaction data, the monitoring service can be configured to create one or more database records of the interaction data. In certain embodiments, the created database records can include versions of the interaction data that are further anonymized, obfuscated, or combined. For instance, multiple interaction data representing dwell times of different users can be combined to generate an average dwell time or other suitable statistics of the UI output. In other embodiments, the monitoring service can also insert additional data or metadata, such as a time of reception, to the created data records. The monitoring service can then be configured to store the database records in a network storage for consumption by other computing services at the computing facility based on certain access privileges.

Several embodiments of the disclosed technology can thus allow detection and collection of interaction data at client devices instead of at remote servers. As such, interaction data that may not be readily captured at remote servers can be captured and consumed by other computing services at a computing facility. In addition, interaction data related to the same content can be detected and captured across different client applications and without the client applications to understand how to produce such interaction data. For instance, interaction data of the same content can be captured from email, instant messaging, or other types of messaging applications. As such, workloads on the remote servers as well as bandwidth of computer networks interconnecting the remote servers to the client devices can be reduced to improve system performance.

DETAILED DESCRIPTION

Figure 1:
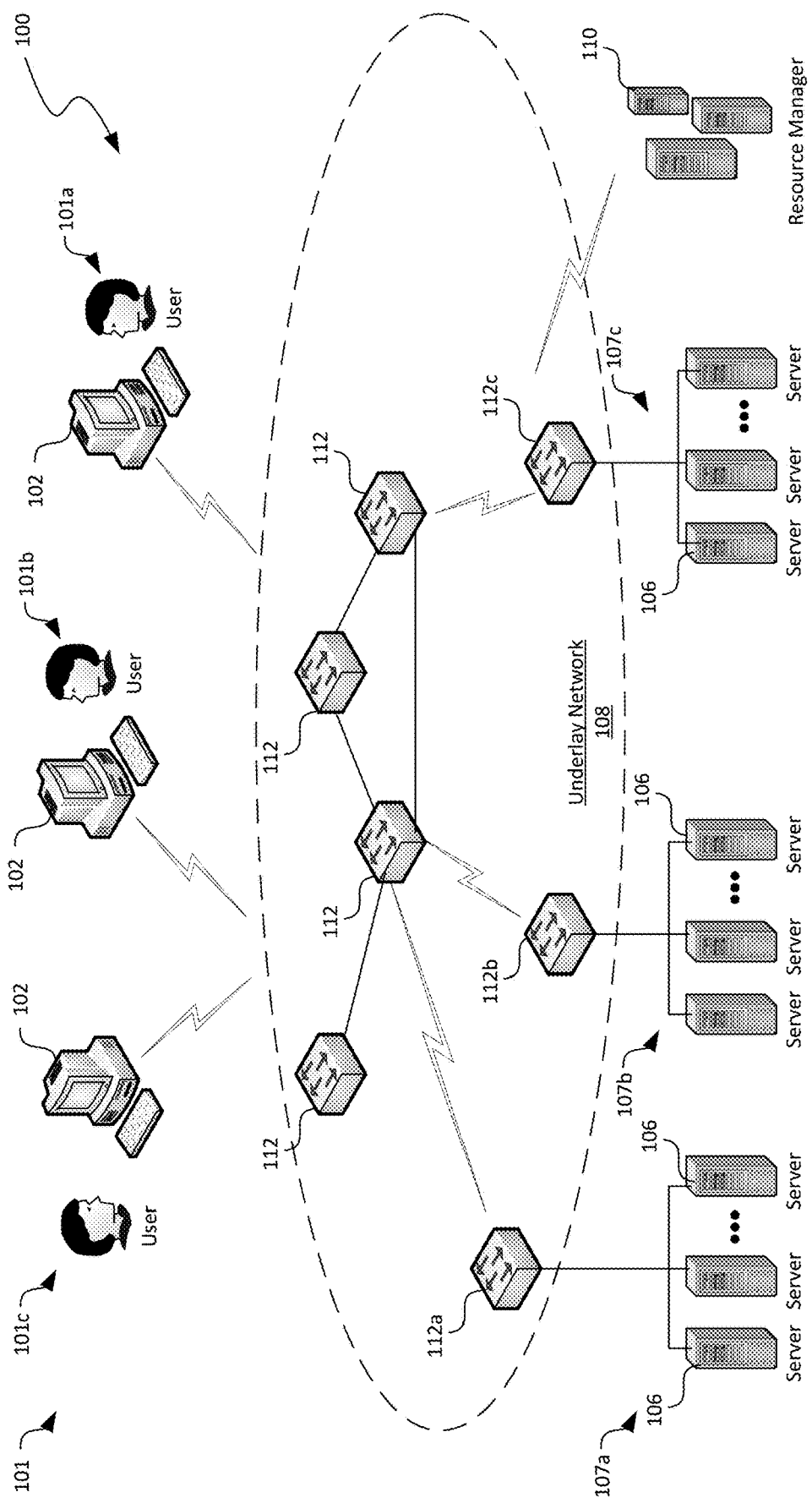
FIG. 1 is a schematic diagram illustrating a distributed computing system implementing interaction data processing in accordance with embodiments of the disclosed technology.

Certain embodiments of systems, devices, components, modules, routines, data structures, and processes for implementing client-side interaction data processing in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

Many terminologies are used herein to illustrate various aspects of the disclosed technology. Such terminologies are intended as examples and not definitions. For instance, a distributed computing system can be a computing facility having a computer network interconnecting a plurality of host machines or hosts to one another or to external networks (e.g., the Internet). An example of such a computing facility can include a datacenter for providing cloud computing services. A compute network can include a plurality of network devices. A network device can be a physical network device, examples of which include routers, switches, hubs, bridges, load balancers, security gateways, or firewalls. A host or host device can include a computing device that is configured to implement, for instance, one or more virtual machines, containers, or other suitable virtualized components. For example, a host can include a remote server having a hypervisor configured to support one or more virtual machines, containers, or other suitable types of virtual components. In another instance, a host can also include a desktop computer, a laptop computer, a smartphone, a web-enabled appliance (e.g., a camera), or other suitable computing devices configured to implement one or more containers or other suitable types of virtual components.

In another example, a hypervisor can include computer software, firmware, and/or hardware that creates, manages, and runs one or more virtual machines on a host machine. A virtual machine or VM is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

In another example, a computing service or cloud service can include one or more computing resources provided over a computer network such as the Internet. Example cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally includes delivery of operating systems and associated services over the computer network without requiring downloads or installation. IaaS generally includes outsourcing equipment used to support storage, hardware, servers, network devices, or other components, all of which are made accessible over a computer network.

In certain computing systems, data of user interactions are captured at a remote server that receives a function call from a client application executed at a client device. However, such server-side monitoring can have certain drawbacks. For instance, certain user interactions may not involve any function calls to the remote server, and thus may not be monitored at the remote server. In another example, the remote server may be managed by a third party. As such, even when user interactions involve function calls to the remote server, the provider of the remote server may not be allowed to and/or willing to share such information.

Several embodiments of the disclosed technology are directed to techniques of client-side interaction data capturing. In one example, an author of content can declaratively define content items and interaction data to be captured in a definition file. Upon receiving a request for the content, a monitoring service can be configured to render the content items as a UI output and embed one or more scripts in the rendered UI output for capturing interaction data. Upon receiving the UI output at a client device, the embedded one or more scripts are automatically executed upon having user consent and continually monitor for user interactions with the content items on the UI output. Once a user interaction is detected, one of the executed scripts can be configured to generate interaction data representing the detected user interaction. The generated interaction data can then be transmitted to the monitoring service for archiving, distribution, or otherwise processed. As such, events of user interactions with the content items can be captured at the client device instead of a remote server, as described in more detail below with reference to FIGS. 1-5.

FIG. 1 is a schematic diagram illustrating a distributed computing system 100 implementing client-side interaction data processing in accordance with embodiments of the disclosed technology. As shown in FIG. 1, the distributed computing system 100 can include a computer network (shown as an "underlay network 108") interconnecting a plurality of servers 106, a plurality of client devices 102 of users 101, and a resource manager 110 to one another. The resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 to access various computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
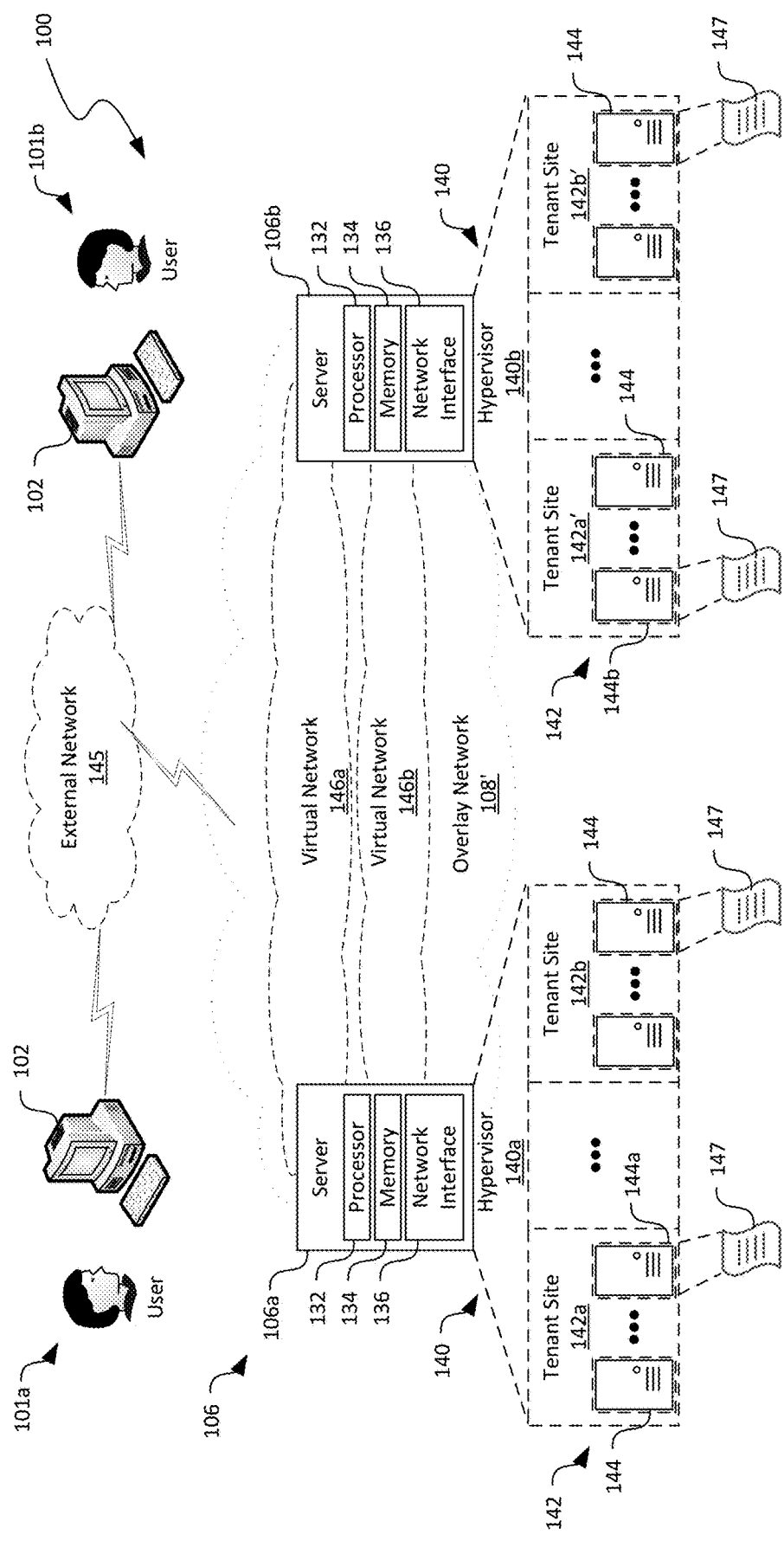
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a processor 132, a memory 134, and a network interface 136 operatively coupled to one another. The processor 132 can include one or more central processing units, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 6A and 6B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the processor 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. Though the hypervisors 140 are individually shown as software components in FIG. 2, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications 147 or processes corresponding to an operating system, middleware, and/or suitable applications. The executed applications 147 can each correspond to one or more computing services. Examples of such computing services can include platform services, microservices, authentication services, or other suitable types of computing services. As discussed in more detail below with reference to FIGS. 3A-3E, the executed applications 147 can also provide a monitoring service 150 (shown in FIG. 3A) that is configured to capture client-side user interactions.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines 144 and/or applications 147 executing in the virtual machines 144. For example, the processor 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

FIGS. 3A-3E are schematic block diagrams of the distributed computing system 100 having a monitoring service 150 for facilitating client-side interaction data processing in accordance with embodiments of the present technology. In FIGS. 3A-3E and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
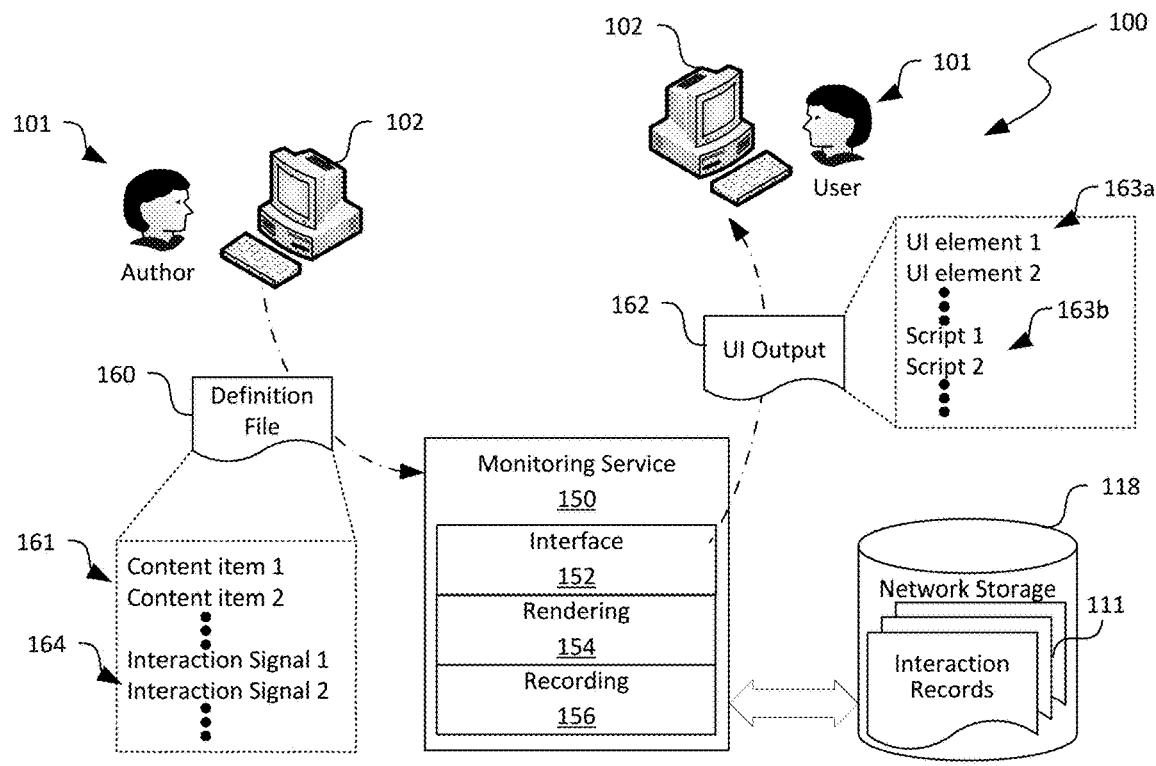
FIGS. 3A-3E are schematic block diagrams illustrating certain operations of interaction processing in the distributed computing system of FIG. 1 in accordance with embodiments of the present technology.

As shown in FIG. 3A, the distributed computing system 100 can include a monitoring service 150 interconnected to a network storage containing interaction records 111. In the illustrated embodiment, the monitoring service 150 includes an interface component 152, a rendering component 154, and a recording component 156 operatively coupled to one another. In other embodiments, at least one of the foregoing components may be provided by another computing service in the distributed computing system 100. For instance, the recording component 156 can be configured as a standalone computing service or a part of another computing service. In further embodiments, the monitoring service 150 can also include network, security, or other suitable types of components in addition to those shown in FIG. 3A.

The interface component 152 can be configured to communicate with client devices 102. For instance, as shown in FIG. 3A, the interface component 152 can be configured to receive a definition file 160 from an author 101 of content. In the illustrated example, the definition file 160 can include data defining one or more content items 161 and one or more interaction data 164. The content items 161 can include various types of content. Examples of such content items 161 can include text, images, video, as well as buttons, web links, attachments, etc.

The interaction data 164 can be declaratively defined in the definition file 160 for detecting various interactions with the content items 161. For instance, interaction data can be defined for an event when a button is actuated. Other interaction data can be defined for an event when a web link is clicked. Further interaction data can be defined for events such as opening an attachment, responding to an inquiry, or other suitable events. The following is an example definition in JSON for a content item 161 and associated interaction data 164 in the definition file 160 that defines a button/web link and an associated interaction data:

{
"type": "Action.Http",
"title": "Learn more",
"url": "https://examples.com/examples",
"signal": "BrowserUsage"
}

As shown above, the content item 161 includes a type (i.e., "Action.Http"), a title (i.e., "Learn more," an associated universal resource locator ("URL"), and corresponding interaction data 164 for interacting with the content item 161, i.e., "BrowserUsage" indicating an event representing a user using a web browser to access the URL of the content item 161, i.e., https://examples.com/examples.

The following is another example definition in JSON for a content item 161 and interaction data 164 in the definition file 160 that defines a button and associated interaction data:

{
"type": "Action. Http",
"title": "Open the App",
"signal": "AppUsage"
}

As shown above, the example includes the a type, i.e., "Action.Http," a title of "Open the App," and corresponding interaction data 164 indicating an event of a user opening or initiating the application.

In the illustrated embodiment, upon receiving the definition file 160, the interface component 152 can perform suitable processing such as authentication and validation before forwarding the definition file 160 to the rendering component 154. In other embodiments, the interface component 152 can be configured to store a copy of the definition file 160 in, for instance, the network storage 118, or in other suitable storage locations. As shown in FIG. 3A, the rendering component 154 can be configured to render a UI output 162 suitable for being surfaced on the client device 102 based on the definition file 160.

In certain embodiments, the definition file 160 can be in a first format, such as JSON. As such, rendering the UI output 162 can include converting the definition file 160 into a second format, such as an HTML document. As shown in FIG. 3A, the UI output can include UI elements 163a and scripts 163b individually corresponding to the defined content items 161 and interaction data 164, respectively. In one implementation, each of the scripts 163b can be generated directly from the interaction data 164. In other implementations, the rendering component 154 can be configured to search a database (not shown) for pre-configured scripts 163b based on the defined interaction data 164. The rendering component 154 can then be configured to retrieve the scripts 163b and insert the retrieved scripts 163b into the UI output 162. In other embodiments, the rendering component 154 can be configured to render the UI output 162 according to other suitable formats and/or using other suitable techniques.

Figure 3B:
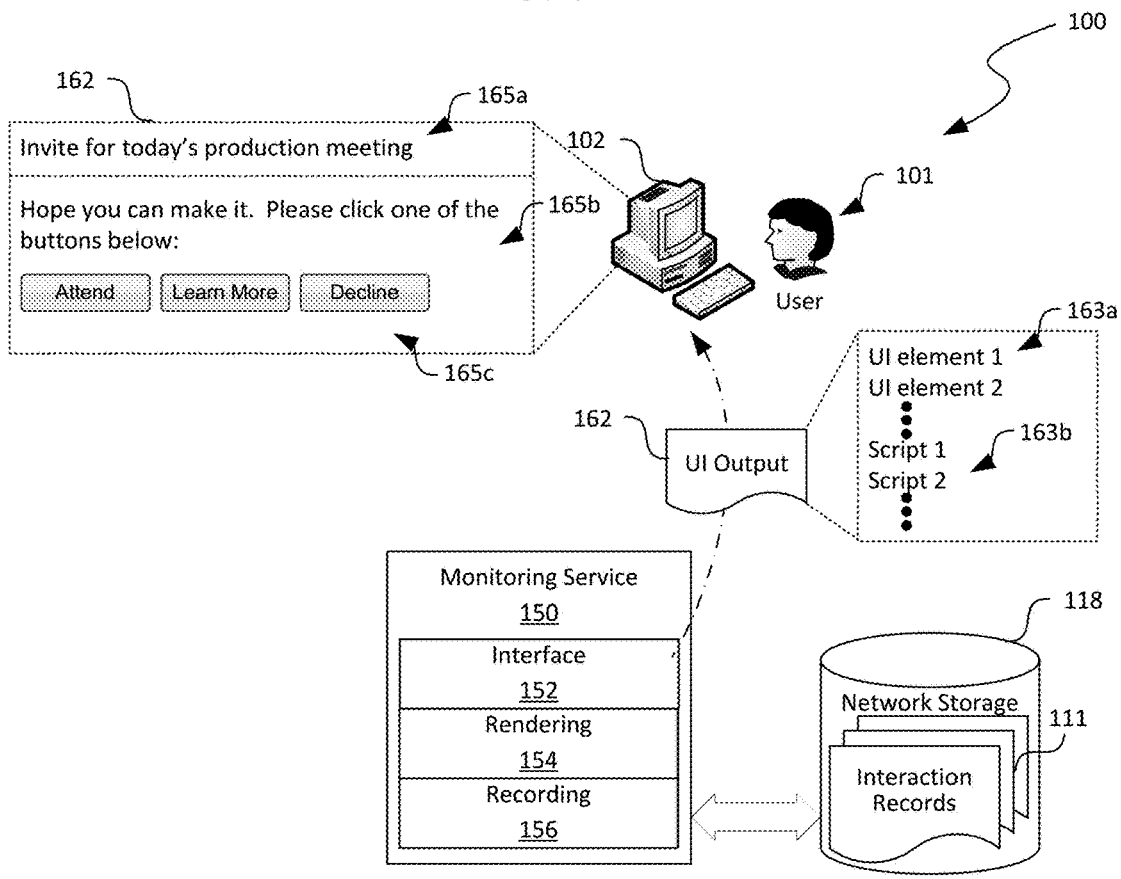

Upon receiving the UI output 162, the client device 102 of the user 101 can be configured to surface the UI output 162 to the user 101. For example, as shown in FIG. 3B, the surfaced UI output 162 includes an email representing a meeting invitation with a subject line 165a (i.e., "Invite for today's production meeting"), a body section 165b (i.e., "Hope you can make it. Please click one of the buttons below"), and multiple buttons 165c, i.e., "Attend," "Learn More," and "Decline." Though particular content items 161 are shown in FIG. 3B for illustrations purposes, in other embodiments, the UI output 162 can also include attached documents, web links, and/or other suitable content items 161.

In certain implementations, the UI output 162 can also include a notification (not shown) indicating to the user 101 that interaction data 164 are to be collected. The UI output 162 can also include a UI element (e.g., an "Agree" button, not shown) that is configured to receive user consent or refusal for collection of such interaction data 164. Upon receiving a user refusal for collection of such interaction data 164, the one or more embedded scripts 163b can be deactivated, for instance, by not automatically executing the one or more scripts upon surfacing the UI output 162 on the client device 102.

Figure 3C:
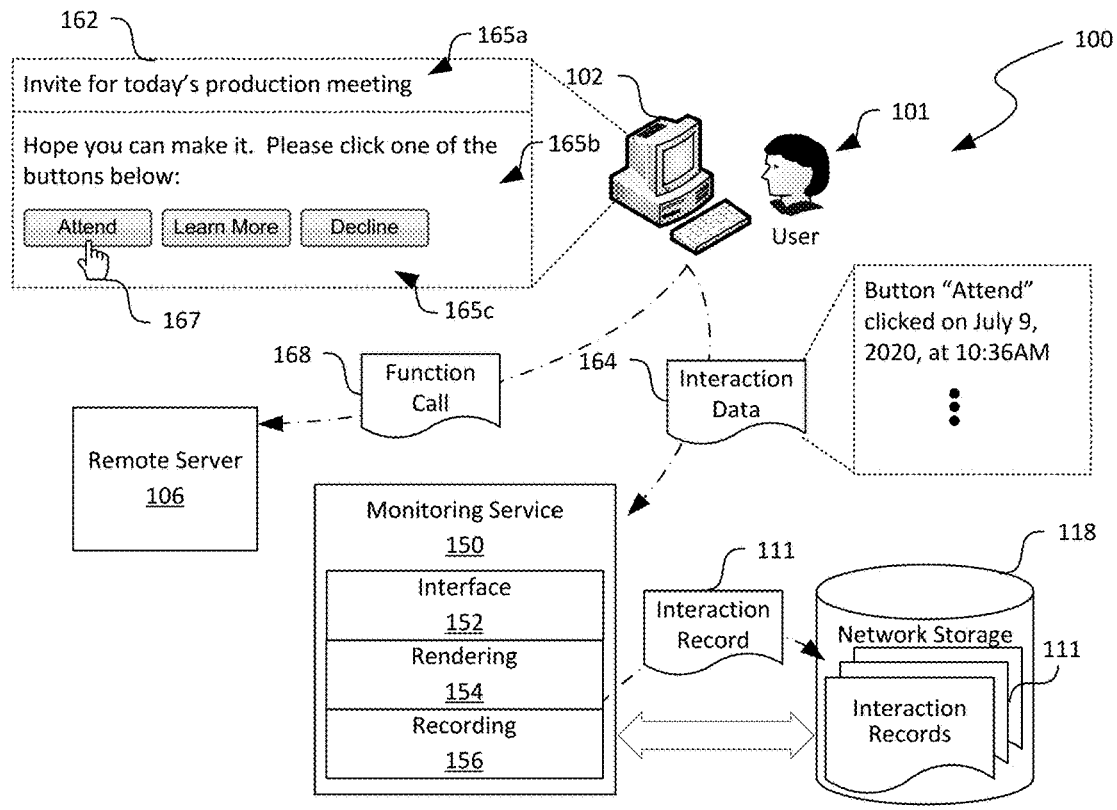

As shown in FIG. 3C, upon receiving consent from the user 101, the scripts 163b can be configured to detect and capture user interactions with the content items 161 at the surfaced UI output 162. For example, the user 101 can actuate the "Attend" button, as indicated by a cursor 167. Upon detecting the actuation of the "Attend" button, one of the scripts 163b can be configured to generate interaction data 164 indicating the detected actuation and transmit the interaction data 164 to the monitoring service 150. In certain implementations, the interaction data 164 can be anonymized or otherwise obfuscated by, for instance, removing all personal identification information, such as name, identification number, IP address, etc. from the interaction data 164. In other examples, multiple interaction data 164 can be combined to generate a single non-identifying interaction data 164. For instance, first interaction data 164 representing surfacing the UI output 162 can be combined with second interaction data 164 representing closing the UI output 162 to generate an interaction data 164 representing a dwell time of the user 101 on the UI output 162.

Figure 3D:
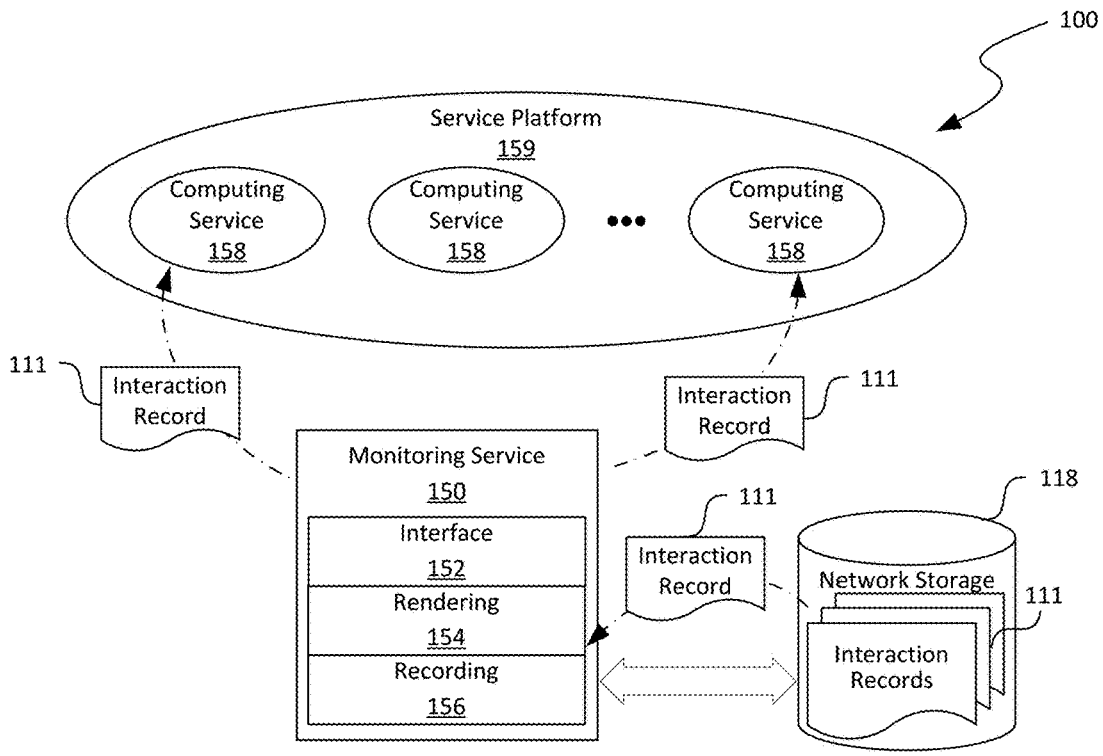
Figure 3E:
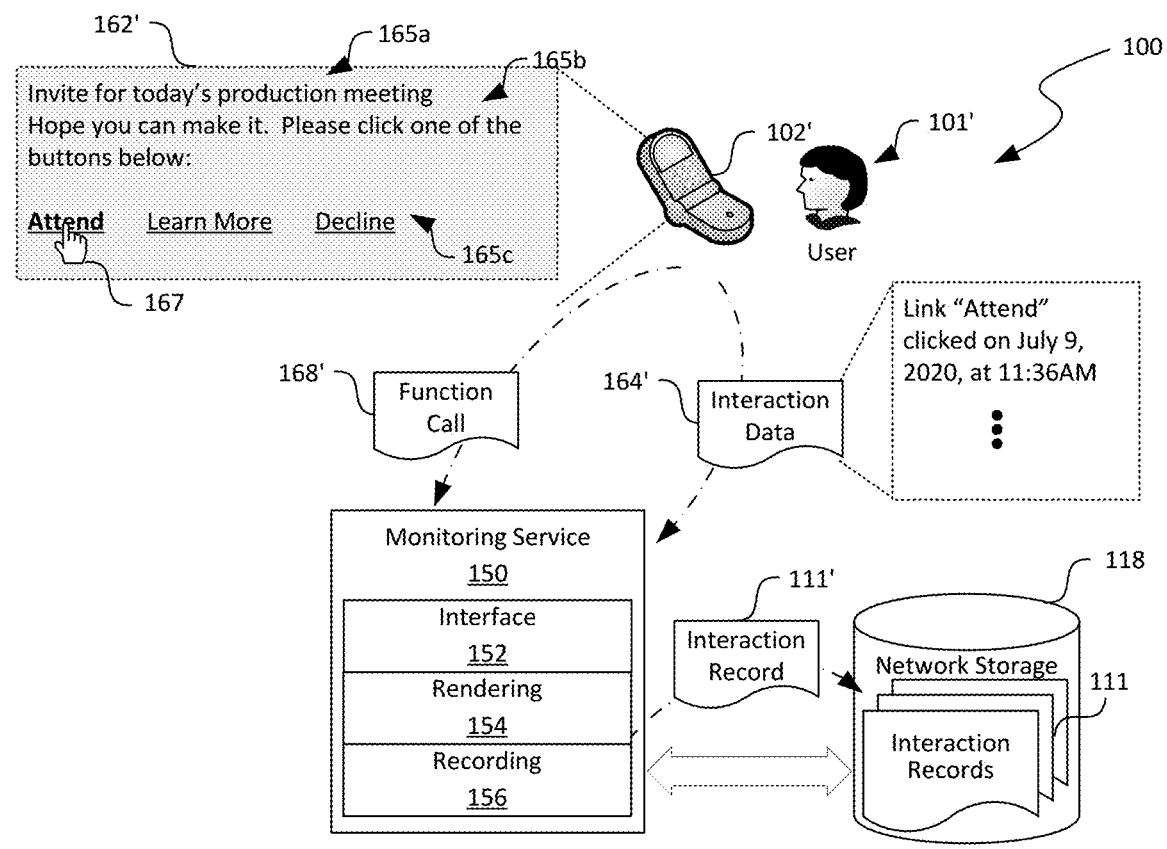

Also shown in FIG. 3C, the actuation of the "Attend" button 165c can also trigger a function call 168 to a remote server 106 in addition to triggering the generation of the interaction data 164. For example, the function call 168 can include a web Application Programming Interface ("API") call to the remote server 106 that hosts a calendar service (not shown). The web API call can request the calendar service to automatically create and store a calendar event for the meeting. In other examples, the function call 168 can trigger other suitable actions on the remote server 106. In the illustrated embodiment, the function call 168 is transmitted to the remote server 106 that is separate from one hosting the monitoring service 150. In other embodiments, the function call 168 can be transmitted to the same remote server 106 that also hosts the monitoring service 150, as shown in FIG. 3E.

Upon receiving the interaction data 164, the recording component 156 of the monitoring service 150 can be configured to create an interaction record 111 based on the received interaction data 164 and store a copy of the interaction record 111 at the network storage 118. In certain embodiments, the created database records 111 can include versions of the interaction data 164 that are further anonymized, obfuscated, or combined. For instance, multiple interaction data 164 representing dwell times of different users 101 can be combined to generate an average dwell time or other suitable statistics of the UI output 162. In other embodiments, the recording component 156 can also insert additional data or metadata, such as a time of reception, to the created data records 111.

The recording component 156 can then be configured to store the database records 111 in the network storage 118 for consumption by other computing services 158 at the distributed computing system. For example, as shown in FIG. 3D, the recording service 156 can be configured to manage and allow access to the stored interaction records 111 by other computing services 158 included in a service platform 159 with suitable access control and credential verification. In other embodiments, one or more additional computing services (not shown) can be configured to manage and allow access to the stored interaction records 111 in addition to or in lieu of the recording service 156 or other suitable components of the monitoring service 150.

Several embodiments of the disclosed technology can allow capturing of interaction data 164 from different client applications 147 (FIG. 2) based on the same definition file 160. For example, as shown in FIG. 3E, the rendering component 154 can be configured to render another UI output 162' for another client application, such as a text messaging application on a smartphone 102'. In the example UI output 162', the subject 165a and the body section 165b are combined into a single section while the buttons 165c are rendered as web links instead of buttons. Though the content items 161 are rendered differently in FIG. 3E than those in FIG. 3C, the UI output 162' can still include the scripts 163b (FIG. 3B) or other suitable software components configured to generate and transmit the interaction data 164' to the monitoring service 150. In the illustrated example, the interaction data 164' includes data indicating that web link "Attend" was clicked on Jul. 9, 2020, at 11:36 AM. Upon receiving the interaction data 164', the recording component 156 can be configured to create another interaction record 111' and store the created interaction record 111' in the network storage 118, as described above with reference to FIG. 3C.

Several embodiments of the disclosed technology can thus allow detection and collection of interaction data 164 at the client device 101 instead of at a remote server 106. As such, interaction data 164, such as dwell time, that may not be readily captured at a remote server can be detected and consumed by other computing services 158 at the computing facility. In addition, interaction data 164 related to the same content can be detected and captured across different client applications 147 and without the client applications 147 to understand how to produce such interaction data 164. For instance, interaction data 164 of the same content can be captured from email clients, instant messaging clients, or other suitable types of messaging applications without remote servers 106 that provide the content to generate the interaction data 164. As such, workloads on the remote servers 106 as well as bandwidth of computer networks 108 interconnecting the remote servers 106 to the client devices 101 can be reduced to improve system performance.

Figure 4A:
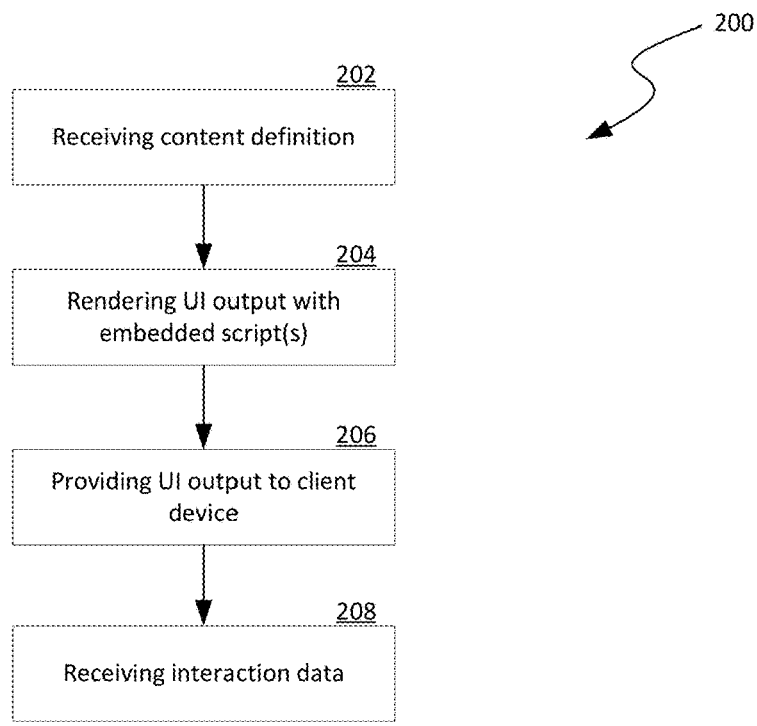
FIGS. 4A and 4B are flow diagrams illustrating aspects of interaction data processing in accordance with embodiments of the present technology.
Figure 4B:
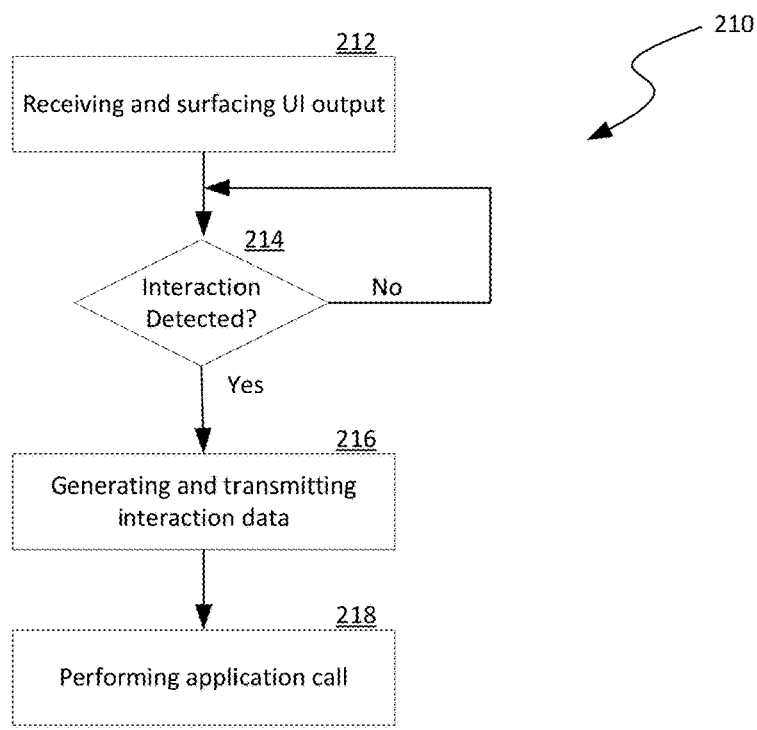

FIGS. 4A and 4B are flow diagrams illustrating aspects of processes for implementing client-side interaction data capturing in accordance with embodiments of the present technology. Though the processes are described below in the context of the distributed computing system 100 shown in FIGS. 1-3E, embodiments of the processes may also be implemented in other computing systems with additional and/or different components.

As shown in FIG. 4A, a process 200 can include receiving content definition at stage 202. The content definition can include a file such as the definition file 160 shown in FIG. 3A or other suitable types of data package. The process 200 can then include rendering a UI output based on the content definition at stage 204. The rendered UI output can include one or more content items configured based on a surrounding (e.g., format, arrangement, etc.) of a client application and one or more scripts embedded in the UI output for capturing events of user interaction with the content items, such as that described above with reference to FIG. 3B. The process 200 can then include providing the UI output to be surfaced in the client application on a client device at stage 206. Upon surfacing the UI output, the embedded scripts can be automatically executed to detect and capture interaction data, as described in more detail below with reference to FIG. 4B. The process 200 can then include receiving data representing interaction data from the client device at stage 208.

As shown in FIG. 4B, operations of detecting user interaction can include receiving and surfacing a UI output in a client application at a client device at stage 212. The operations can then include a decision stage 214 to determine whether a user interaction, such as actuation of a button, click on a web link, etc., is detected. In response to determining that a use interaction has not been detected, the operations can include revert to the decision stage 214 to continue monitoring for any user interactions. In response to determining that a use interaction has been detected, the operations can include generating and transmitting interaction data representing the detected event at stage 216 and performing a function call based on the detected user interaction at stage 218, as described above with reference to FIGS. 3C and 3E.

Figure 5:
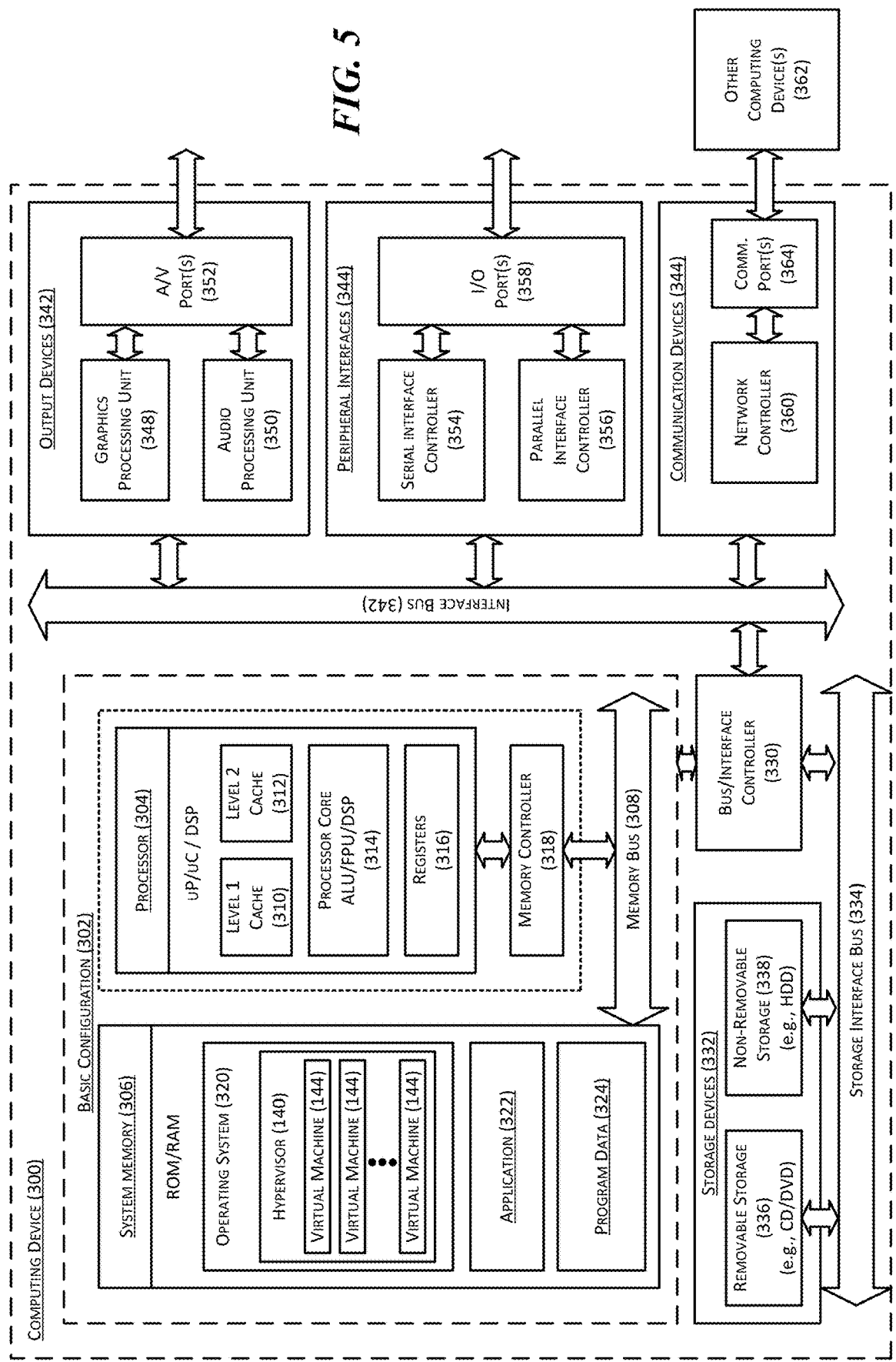
FIG. 5 is a computing device suitable for certain components of the distributed computing system in FIG. 1.

FIG. 5 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (pP), a microcontroller (pC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 140 for managing one or more virtual machines 144. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of interaction data processing in a distributed computing system having a remote server, a network storage, and a client device interconnected with one another via a computer network, the method comprising:
 receiving, from the client device, a request for content via the computer network; and
 in response to receiving the request from the client device, at the remote server,
  rendering a user interface output corresponding to the requested content in accordance with a definition file of the content, the definition file having:
   data defining a content item to be surfaced on the client device; and
   data defining interaction data to be captured from the user interface output when an interaction with the surfaced content item is detected, wherein the user interface output embeds a script to be executed at the client device to capture the interaction data defined in the definition file;
  transmitting, via the computer network, the rendered user interface output of the requested content to the client device that surfaces the content item and executes the embedded script to generate and transmit to the remote server the interaction data upon detecting an interaction with the surfaced content item at the client device; and
  receiving, via the computer network, the transmitted interaction data from the client device and storing the received interaction data as a database record in the network storage of the distributed computing system for access by additional computing service, thereby capturing data representing interactions with the surfaced content item at the client device.

2. The method of claim 1 wherein rendering the user interface output includes:
 generating programming codes for the script based on the data defining the interaction data included in the definition file; and
 embedding the generated programming codes in the user interface output.

3. The method of claim 1 wherein:
 the data defining the content item in the definition file is in a first format; and
 rendering the user interface output includes converting the data defining the content item from the first format to a second format different than the first format.

4. The method of claim 1, further comprising:
 the data defining the content item in the definition file is in JavaScript Object Notation ("JSON"); and
 rendering the user interface output includes generating a Hypertext Markup Language ("HTML") object corresponding to the content item based on the data defining the content item in JSON.

5. The method of claim 1 wherein:
 the request includes a first request;
 the client device includes a first client device executing a first application for surfacing the requested content;
 the user interface output is a first user interface output corresponding to an interface format of the first application; and
 the method further includes:

receiving a second request from a second client device for the same content, the second client device executing a second application for surfacing the requested content; and in response to receiving the second request, rendering a second user interface output corresponding to another interface format of the second application, the rendered second user interface output includes the script configured to generate and transmit to the remote server another interaction data upon detecting an interaction with the surfaced content item at the second client device.

6. The method of claim 1 wherein:
the request includes a first request;
the client device includes a first client device executing a first application for surfacing the requested content;
the user interface output is a first user interface output corresponding to an interface format of the first application; and
the method further includes:
receiving a second request from a second client device for the same content, the second client device executing a second application for surfacing the requested content;
in response to receiving the second request, rendering a second user interface output corresponding to another interface format of the second application, the rendered second user interface output includes the script configured to generate and transmit to the remote server another interaction data upon detecting an interaction with the surfaced content item at the second client device; and
receiving, from the second client device, the another interaction data indicating a detected interaction with the content item at the second client device.

7. The method of claim 1 wherein:
the client device is further configured to generate and transmit a function call upon detecting the interaction with the surfaced content item; and
the method further includes receiving at the remote server, the generated function call from the client device in addition to receiving the transmitted interaction data.

8. The method of claim 1 wherein:
the remote server is a first remote server; and
the client device is further configured to generate a function call upon detecting the interaction with the surfaced content item transmit the generated functional call to a second remote server different than the first remote server.

9. The method of claim 1 wherein:
the embedded script is configured to combine multiple inputs to the surfaced content item detected at the client device into a single interaction data; and
receiving the transmitted interaction data includes receiving the transmitted single interaction data representing multiple detected inputs to the surfaced content item.

10. A method of interaction data processing at a client device interconnected with a remote server via a computer network, the method comprising:
receiving, at the client device, a user interface output rendered by the remote server, the user interface output having a content item to be surfaced on the client device and a script configured to detect an interaction with the content item at the client device; and
upon receiving the user interface output, at the client device, surfacing the user interface output having the content item on a display of the client device;

automatically executing, with a processor of the client device, the script embedded in the user interface output to detect an interaction with the surfaced content item at the client device; and
upon detecting an interaction with the content item on the surfaced user interface output, generating the interaction data representing the detected interaction and transmitting to the remote server the generated interaction data indicating the detected interaction with the surfaced content item at the client device.

11. The method of claim 10, further comprising:
upon detecting the interaction with the content item on the surfaced user interface output, generating and transmitting to the remote server a functional call corresponding to the detected interaction.

12. The method of claim 10 wherein:
the remote server is a first remote server; and
the method further includes upon detecting the interaction with the content item on the surfaced user interface output, generating and transmitting to a second remote server a functional call corresponding to the detected interaction, the second remote server being different than the first remote server.

13. The method of claim 10 wherein:
the detected interaction is a first interaction; and
the method further includes:
detecting a second interaction with the content item on the surfaced user interface output;
combining the first and second interactions into a single interaction data; and
transmitting to the remote server the generated interaction data includes transmitting to the remote server the generated single interaction data.

14. The method of claim 10 wherein:
the detected interaction is a first interaction; and
the method further includes:
detecting a second interaction with the content item on the surfaced user interface output;
combining the first and second interactions into a single interaction data; and
transmitting to the remote server the generated interaction data includes transmitting to the remote server the generated single interaction data in lieu of additional interaction data representing the first and second interactions.

15. The method of claim 10 wherein:
the detected interaction is a first interaction corresponding to surfacing the user interface output; and
the method further includes:
detecting a second interaction with the content item on the surfaced user interface output, the second interaction representing a closing of the surfaced user interface output;
combining the first and second interactions into a single interaction data representing a dwell time on the surfaced user interface output; and
transmitting to the remote server the generated interaction data includes transmitting to the remote server the generated single interaction data representing the dwell time in lieu of additional interaction data representing the first and second interactions.

16. A computing device in a distributed computing system interconnected to a remote server via a computer network, the computing device comprising:
a processor; and a memory operatively coupled to the processor, the memory containing instructions executable by the processor to cause the computing device to:
   upon receiving, at the computing device, a user interface output rendered by the remote server, the user interface output having a content item to be surfaced on the client device and a script configured to detect an interaction with the content item at the client device,
      surface the user interface output having the content item on a display of the client device;
      automatically execute, with a processor of the computing device, the script embedded in the user interface output to detect an interaction with the surfaced content item at the computing device; and
      upon detecting an interaction with the content item on the surfaced user interface output, generating the interaction data representing the detected interaction and transmitting to the remote server the generated interaction data indicating the detected interaction with the surfaced content item at the computing device.

17. The computing device of claim 16 wherein:
the remote server is a first remote server; and
the memory includes additional instructions executable by the processor to cause the computing device to generate and transmit to a second remote server a functional call corresponding to the detected interaction upon detecting the interaction with the content item on the surfaced user interface output, the second remote server being different than the first remote server.

18. The computing device of claim 16 wherein:
the detected interaction is a first interaction; and
the memory includes additional instructions executable by the processor to cause the computing device to:
   detect a second interaction with the content item on the surfaced user interface output;
   combine the first and second interactions into a single interaction data; and
to transmit to the remote server the generated interaction data includes to transmit to the remote server the generated single interaction data.

19. The computing device of claim 16 wherein:
the detected interaction is a first interaction; and
the memory includes additional instructions executable by the processor to cause the computing device to:
   detect a second interaction with the content item on the surfaced user interface output;
   combine the first and second interactions into a single interaction data; and
to transmit to the remote server the generated interaction data includes to transmit to the remote server the generated single interaction data in lieu of additional interaction data representing the first and second interactions.

20. The computing device of claim 16 wherein:
the detected interaction is a first interaction corresponding to surfacing the user interface output; and
the memory includes additional instructions executable by the processor to cause the computing device to:
   detect a second interaction with the content item on the surfaced user interface output, the second interaction representing a closing of the surfaced user interface output;
   combine the first and second interactions into a single interaction data representing a dwell time on the surfaced user interface output; and
to transmit to the remote server the generated interaction data includes to transmit to the remote server the generated single interaction data representing the dwell time in lieu of additional interaction data representing the first and second interactions.

* * * * *